United States Patent [19]

Glasgow et al.

[11] Patent Number: 4,542,765

[45] Date of Patent: Sep. 24, 1985

[54] PNEUMATIC LIQUID LEVEL CONTROL HAVING EITHER THROTTLING OF SNAP ACTION

[75] Inventors: Clarence Glasgow, Tulsa; Randall W. Alberty, Locust Grove, both of Okla.

[73] Assignee: Custom Engineering and Manufacturing Corp., Tulsa, Okla.

[21] Appl. No.: 537,783

[22] Filed: Sep. 30, 1983

[51] Int. Cl.⁴ .................. F16K 31/34; F16K 33/00
[52] U.S. Cl. .................. 137/390; 137/414; 137/426; 251/28
[58] Field of Search .......... 137/85, 270, 390, 413, 137/416, 426, 82, 414; 251/28

[56] References Cited

U.S. PATENT DOCUMENTS

| | | | |
|---|---|---|---|
| 2,649,771 | 8/1953 | Parks | 137/413 |
| 3,088,485 | 5/1963 | Hanssen | 137/413 |
| 3,120,241 | 2/1964 | Parks | 137/413 |
| 3,413,997 | 12/1968 | Taylor | 137/270 |
| 3,840,044 | 10/1974 | Harris et al. | 137/413 |

Primary Examiner—George L. Walton
Attorney, Agent, or Firm—Head, Johnson & Stevenson

[57] ABSTRACT

A pneumatic control providing both a snap action mode and a throttling mode, action including a gas inlet connected to a source of gas pressure, a nozzle in communication with an exhaust port, a nozzle seat moveable to and away from the nozzle in response to a mechanically applied control action such as a liquid level float, a gas chamber in the flow passageway between the gas inlet and the nozzle port, a first passageway from the gas chamber to a control gas outlet, a diaphragm actuated valve in the first passageway, a second passageway from the gas chamber to the control gas outlet, a throttling screw serving to open or close the second passageway and a shut-off screw providing means of opening or closing the first passageway whereby the application of gas pressure to the control port in response to the closing of the nozzle is determined by the position of the throttling screw and the shut-off screw.

3 Claims, 7 Drawing Figures

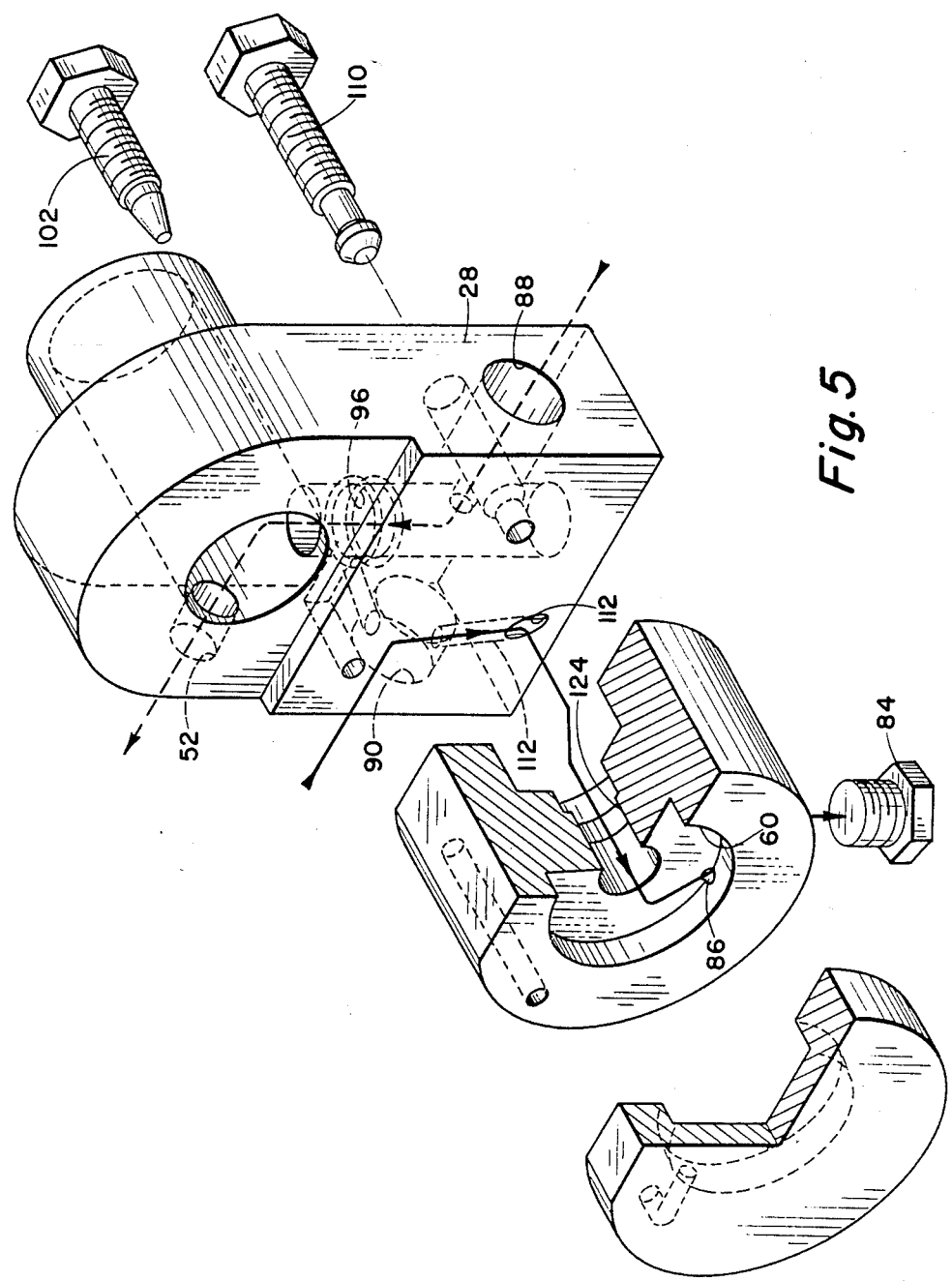

PNEUMATIC LIQUID LEVEL CONTROL HAVING EITHER THROTTLING OF SNAP ACTION

SUMMARY OF THE INVENTION

The present invention is directed towards an improved pneumatic control. Industrial applications of pneumatic controls usually function in one of two ways that is either an on-off mode or a throttling mode. The on-off mode is commonly referred to as the "snap action" mode. The user is required to choose between the type of pneumatic control device desired. When it was necessary to change from one type of control to the other the user is required to change out the control devices completely. The present invention is directed towards a pneumatic control wherein the user has the choice of either operating the control in a snap action mode or in a throttling mode and wherein he can expeditiously change the control from one mode to the other without the requirement of replacing the entire control system.

The device is in the form of a pneumatic control having a gas inlet connected to a source of gas pressure. Within the body of the device a nozzle port is in communication with an exhaust port. A nozzle seat is moveable to and away from the nozzle port in response to a mechanically applied control action. In a typical application of the invention the nozzle seat may be in the form of a cantilevered rod having a seat at one end, the other end of the rod having a float so that as the float is lifted by rising fluid level within a vessel, the seat is pivoted downwardly to engage the nozzle port and close it.

A gas chamber is provided in the flow passageway between the gas inlet and the nozzle port. A first passageway is provided in the body of the device from the gas chamber to a control gas outlet. The control gas outlet is typically connected by piping with a pneumatically actuated device, such as a pneumatic valve which can either be closed or opened to control fluid flow into or out of a vessel.

A diaphragm actuated valve is secured to the body of the control mechanism and functions to open or close the first passageway. A second passageway from the gas chamber to the control gas outlet is provided. A throttling screw is contained within the control body to open or close the second passageway. A shut off screw provides means to open or close the first passageway. Thus, if the device is to function in a snap action mode, the shut off screw is opened and the throttling screw is closed. Therefore, when the float functions to close the flow of gas out of the nozzle, gas pressure builds up in the gas chamber. This gas pressure is communicated by the first passageway to the diaphragm actuated valve which, when the gas pressure reaches a pre-selected level, actuates to immediately open the first passageway. This provides direct gas communication between the chamber and the control gas outlet, providing gas pressure to the control gas outlet to affect the function of pneumatically controlled device to which the control gas outlet is connected. On the other hand, if the shut off screw is closed and the throttling screw is opened, pressure build up within the gas chamber passes through the second passageway from the gas chamber into the control gas outlet, providing variable gas pressure to the control outlet in response to the degree of closure of the nozzle port which, in turn, in the exemplary arrangement, is responsive to the elevational position of the float.

Thus the user of the device of this invention can selectably employ the pneumatic control either as a snap action, that is on-off, pneumatic control sending device or as a throttling pneumatic control sending device by adjusting a shut off screw and a throttling screw.

For an example of a preferred method of applying the principles of this invention reference may now be had to the following specifications taken in conjunction with the attached drawings.

DESCRIPTION OF THE DRAWINGS

FIG. 5 is an exploded view as in FIGS. 2, 3 and 4 and showing the flow paths when the control device is in the snap action mode and wherein the fluid level has dropped, opening the flow of gas from the nozzle port and showing the flow path by which pressure is released from the control gas port.

DETAILED DESCRIPTION OF THE PREFERRED EMBODIMENT

Figure 1:
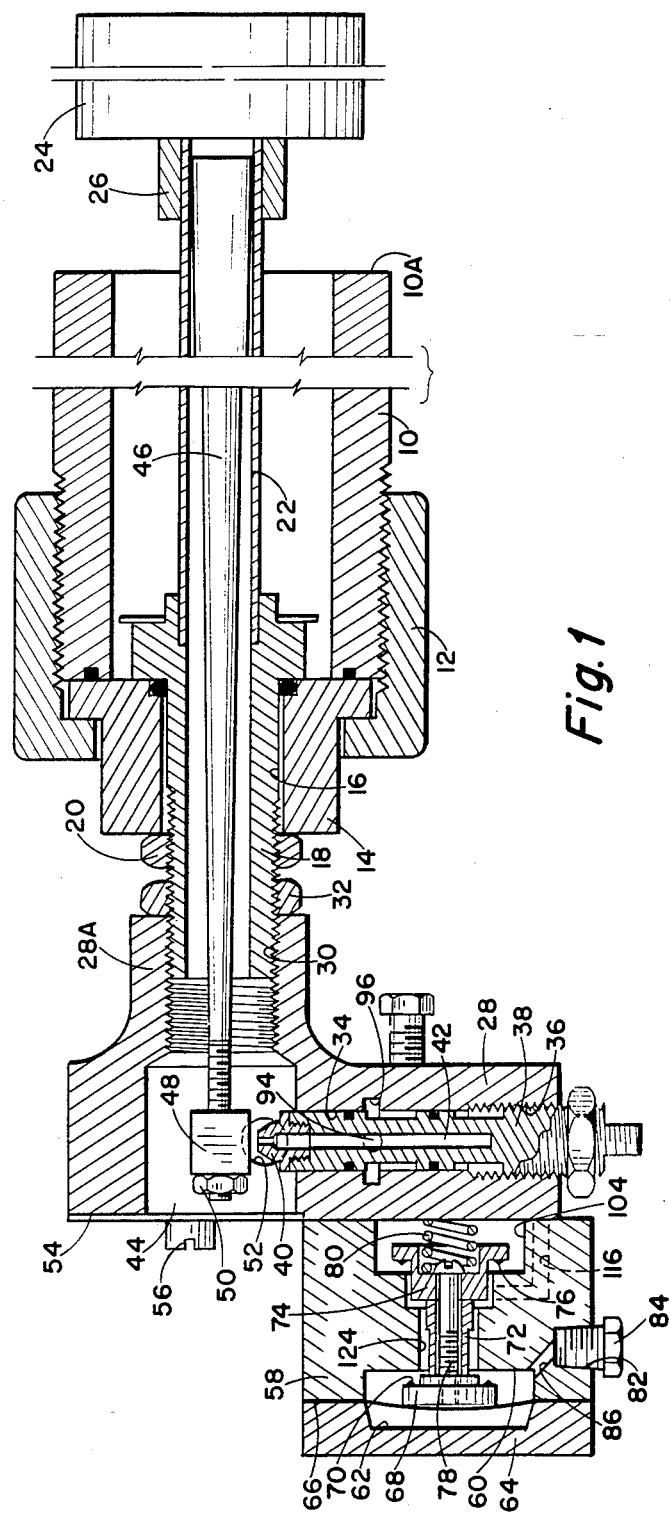
FIG. 1 is a cross-sectional elevational view of an embodiment of the invention as particularly used for a float operated pneumatic control.

Referring now to the drawings and first to FIG. 1 an example of the type apparatus with which the invention may be practiced is shown. The invention will be described as it is particularly applicable for providing a pneumatic control signal in response to the fluid level in a vessel. A weld neck 10 is adaptable to be affixed at its outer end 10A to an opening in a vessel (not shown). The inner exterior portion of the weld neck 10 is threaded and receives a union 12 which secures a flange 14 to the inner end of the weld neck. An opening 16 in the flange receives a tube flange adapter 18 which is externally threaded, and which is held in the opening 16 by means of a nut 20. The outer end of the tube flange adapter supports a fulcrum tube 22. At the outer end of the fulcrum tube is a float 24 secured by means of a coupling 26.

A control housing 28 has an integral boss portion 28A having internal threads 30 which receives the externally threaded end of the tube flange adapter 18. A nut 32 retains the housing 28 in position on the outer end of the tube flange adapter. The control housing 28 has an elongated opening 34 in it which is internally threaded at its lower end and receives an elongated level adjusting member 38. At the upper end of the level adjusting member is a nozzle 40. The level adjusting member has a flow passageway 42 therein communicating with the nozzle 40.

The upper interior of the control housing 28 has a cavity 44 which is an enlarged extension of the internally threaded opening through the boss portion 28A. The nozzle 40 is within the cavity 44. Secured to the outer end of the fulcrum tube 20 and received within the tube is an elongated sensing rod 46. The inner end of the sensing rod is threaded and receives a nozzle seat 48 held in position by a nut 50. In a manner which will be described in greater detail subsequently, the pneumatic control device of FIG. 1 functions by means of gas pressure applied to the gas chamber 42 within the level adjusting member 38. This gas flows out through the nozzle 40 into cavity or chamber 44 and, when the nozzle is unobstructed, out through an exhaust port 52. As long as the nozzle 40 is unobstructed the gas flow is with relatively little resistance and gas pressure remains low in the flow passageway 42. However, if liquid rises in the vessel to which the weld neck 10 is connected, to the level wherein it acts on float 24, the fulcrum tube 22 is slightly upwardly bent, pivoting the sensing rod 46 downwardly so that the nozzle seat 48 approaches and ultimately contacts nozzle 40, closing off, or at least substantially retarding the flow of gas through the nozzle. When this occurs, the pressure builds up in chamber 42 and this pressure build-up is employed to provide a signal to a pneumatically actuated device such as a pneumatically controlled valve (not shown) which can be used either to close off flow of fluid into the vessel to which the control is connected, or open a valve to drain fluid from the vessel. The method by which the flow of gas pressure from the flow chamber 42 to control the operation of a pneumatically actuated device is the critical aspect of the invention. The device which has been illustrated and described up to the point is, by and large, a known apparatus for use in providing a float actuated pneumatic control. The cavity 44 is closed with a cover 54 held in place by bolts 56, only one of which is shown. Threaded recesses in body 28 receive bolts 56, but such recesses are not shown so as to keep the views uncluttered.

Secured to the control housing 28 is a relay body 58. The apparatus contained in and connected with relay body 58 serves to provide a snap action operation of the pneumatic control device. The method by which this is accomplished will be more perfectly understood as the description progresses but the basic elements for achieving this feature are shown in FIG. 1. The body 58 has a recess 60 in the outer end which matches a recess 62 in an end cover 64. A diaphragm 66 is held in place by the end cover and divides recesses 60 and 62. Acted upon by the diaphragm 66 is an outer seat 68 which has a circumferential sealing surface 70. The seat 68 is connected by a tubular member 72 to an inner seat 74 which has a circumferential sealing surface 76. A screw connects the outer and inner seats 76 and 74, the screw being received within the tubular members 72.

A spring 80 compressably extends between the inner seat 74 and control housing 28 to urge the seats 68 and 72 to the left against diaphragm 66.

Formed in the bottom of relay body 58 is threaded opening 82 receiving a plug 84. A passageway 86 communicates the opening 82 with recess 60. When plug 84 is removed pressure within the recess 60 is vented for purposes which will be described subsequently.

Figure 2:
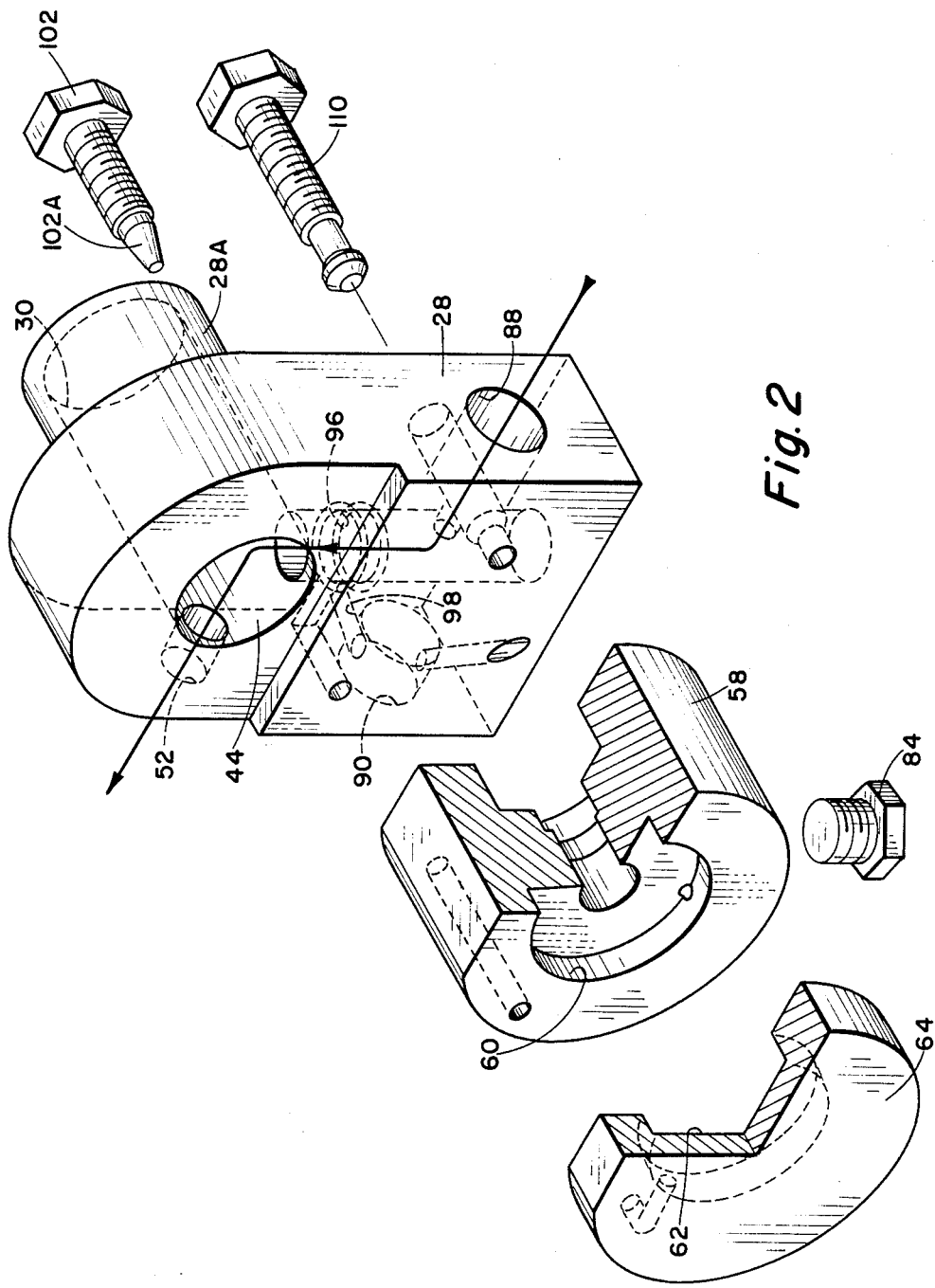
FIG. 2 is an exploded view of the major components of an apparatus used to practice the invention and showing the flow of air through the device when the float is in the down position that is, when the flow nozzle is unobstructed and the flow of gas passes freely through the flow nozzle and out the exhaust port and no actuating control pressure is provided.
Figure 7:
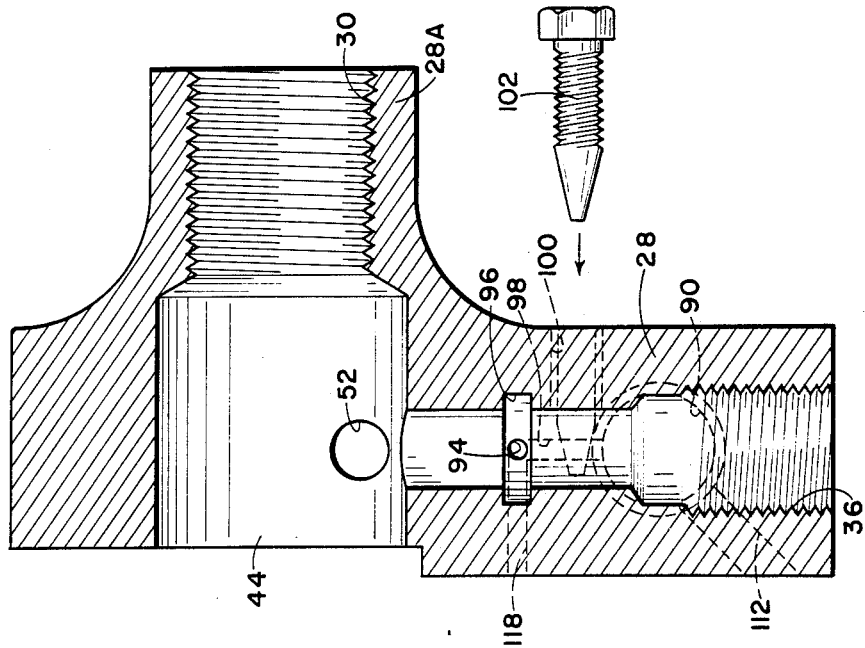
FIG. 7 is a cross-sectional view of the control housing taken along the line 7—7 of FIG. 6.
Figure 6:
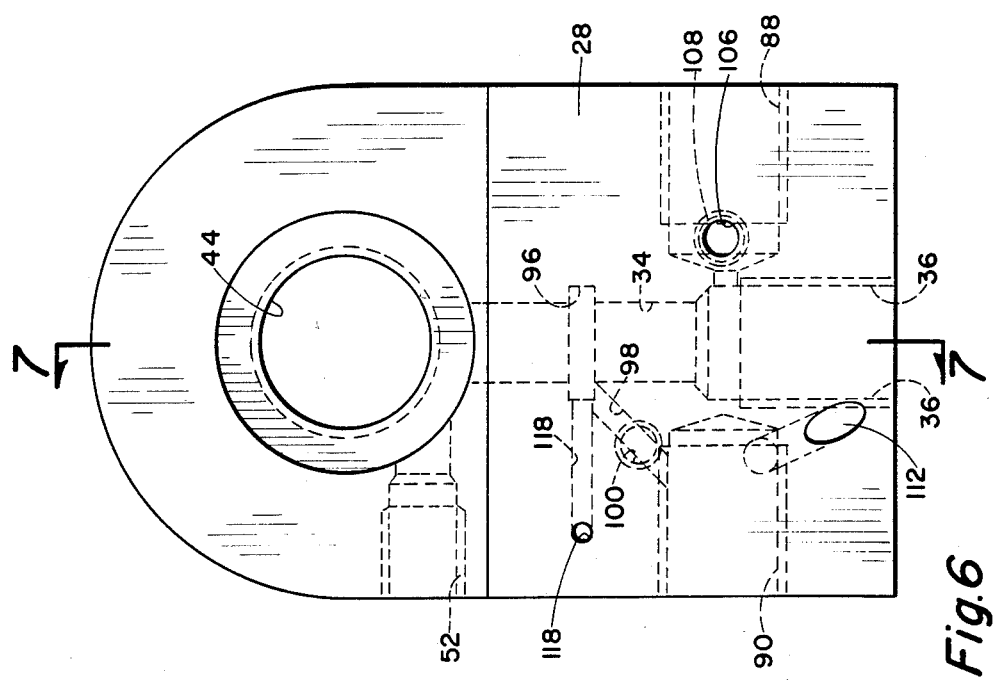
FIG. 6 is a front elevational view of the control housing showing the configuration of ports which may be employed in practicing the invention.

Referring to FIGS. 2, 6 and 7, more details of the controls of the invention will be described and the paths of air flow will be illustrated. FIG. 6 is a front view of the control body 28 with the relay body removed and with the cavity cover removed. FIG. 2 is an exploded view with some of the elements not being illustrated so as to make it possible to illustrate the flow passageways without obstruction. The controlled housing 28 includes an air pressure inlet 88, a control air outlet 90 and the exhaust port 52. The control air inlet communicates with the flow passageway 42 within the level adjusting member 38 as shown in FIG. 1. Within adjusting member 38 is a radially extending port 94 as seen in FIG. 1 which connects with a circumferential enlarged internal diameter passageway 96. Thus air pressure supplied to inlet 88 is communicated through the passageways 42 and 94 into the circumferential passageway 96. The same passageways connect with nozzle 40. FIG. 2 shows by a solid line and with arrows indicating the direction of flow, the passage of air which moves through the control when the float is in the downward position, that is, when the nozzle 40 is unobstructed. It can be seen that the flow of gas passes freely from the inlet 88, into the chamber 42 within the level adjusting member 38 and out the nozzle 40, even though these members are not illustrated in FIG. 2, and vents out through the exhaust port 52. Since this path of gas flow is free and unobstructed, no pressure build up occurs within the interior of the control.

Figure 3:
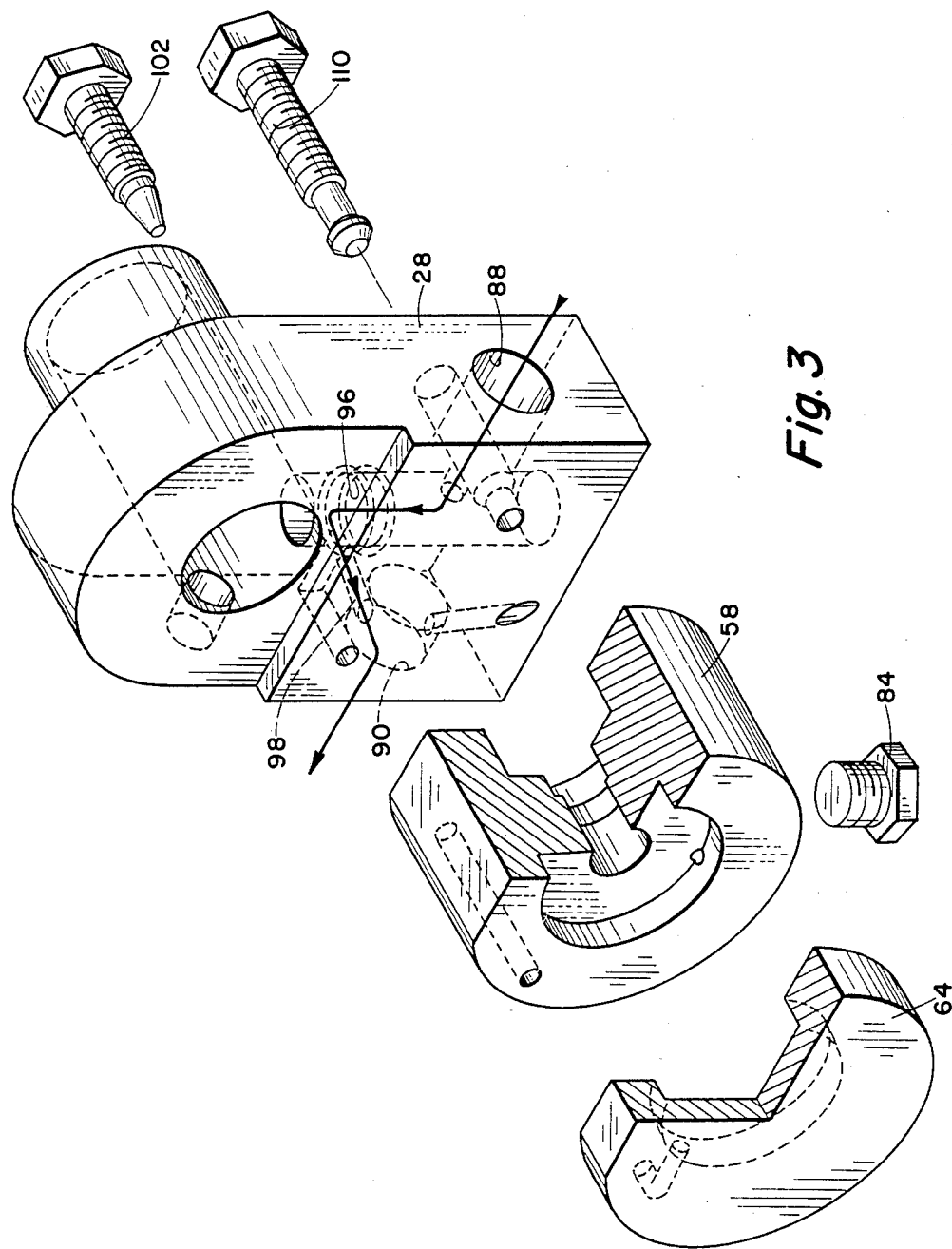
FIG. 3 is an exploded view as in FIG. 2 showing the direction of movement of gas through the device when it is in the throttling mode and when the float is in the upper position closing or at least substantially closing gas flow through the nozzle.

There is provided between the circumferential gas passageway 96 and the control air outlet 90, a first flow passageway 98. This is best seen in FIG. 7. Formed in the housing 28 is a threaded opening 100 which intersects the first passageway 98. An throttling screw 102 has a tapered inner end 102A. When the throttling screw 102 is fully threadably inwardly advanced, the first passageway 98 is closed. However, when it is retracted, the passageway is opened and the rate of gas flow through the passageway 98 can be controlled by the positioning of the throttling screw 102. FIG. 3 illustrates the path of gas flow which occurs when the nozzle seat 48 is in contact, or substantial contact with the nozzle 40 causing pressure build up within the gas cavity 42. This pressure build up flows through the first flow passageway 98 into the control gas outlet 90 providing a control signal. This flow path assumes that the throttling screw 102 is threaded rearwardly, opening the flow passageway 98. It can be seen that the gas pressure applied to the control air outlet 90 will be directly related to the pressure build up within the gas chamber 42 and this in turn will be directly related to the restriction of the passage of gas out through nozzle 40. Thus as the fluid level gradually rises and the nozzle seat approaches closer and closer to the nozzle the gas pressure will gradually build up in the control gas outlet 90. Thus, a throttling function of the control is achieved.

Figure 4:
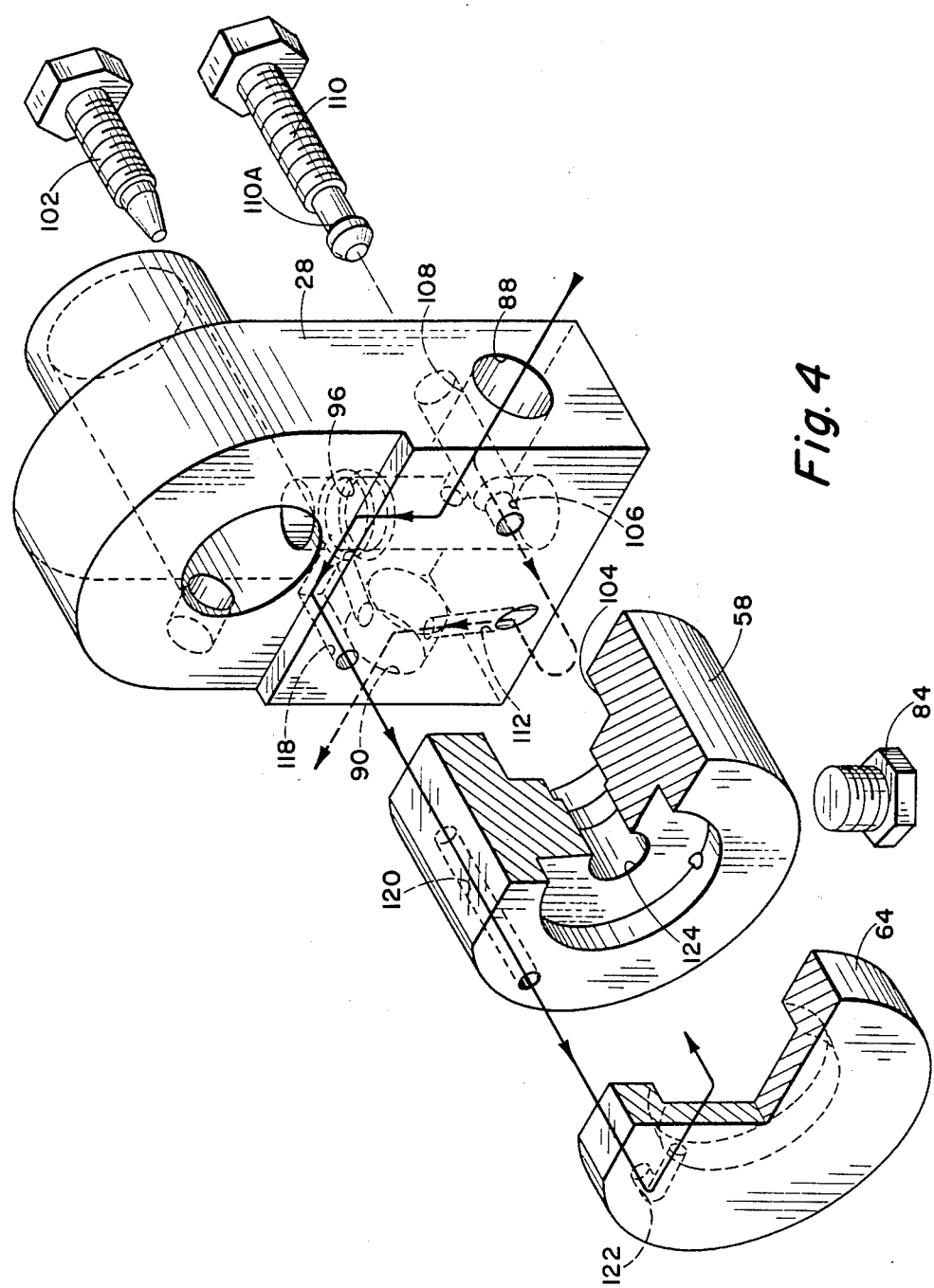
FIG. 4 is an exploded view as in FIGS. 2 and 3 showing the control and the actuated snap action mode showing the path of gas flow when the float has closed the nozzle and the diaphragm portion of the control has actuated to provide gas pressure to the control gas outlet.

In some instances that rather than have a throttling function, it is desireable to have an immediate gas pressure signal applied to the control outlet 90 when the float is raised. This is termed the "snap action" mode of operation. For this purpose, the mechanisms contained within the relay body 58, as illustrated in FIG. 1, are employed, and the flow paths utilized are illustrated with reference to FIGS. 4 and 6. Connecting with the gas pressure inlet 88 and with the interior cavity 104 formed in the inner end of the relay body 58 is a second passageway 106 which is in axial alignment with a threaded opening 108 which communicates with the rearward surface of housing 28. Threadably receivable in opening 108 is a shut off screw 110. A reduced diameter inner end 110A, when received in the second passageway 106 serves to close it but when shut off screw 110 is rearwardly threaded, the passageway 106 is opened. It can be seen that the threaded passageway 108 passes through the gas inlet opening 88 but since it is of smaller diameter, the screw 110 does not obstruct the flow of gas through the gas inlet. There is a third passageway 112 in the control body 28 which connects with a fourth passageway 116 in the relay body 58 as shown in dotted outline in FIG. 1. Thus, the third passageway 112 is connected with the rearward face of the inner seat 74. When the inner seat is displaced to the right, against the compression of spring 80, releasing sealing surface 76, and, with the shut off screw 110 rearwardly threaded, or in the opened condition, a flow path is provided from the inlet passage 88 through second passageway 106, through fourth passageway 116, through third passageway 112, to the control gas outlet 90. The opening of this passageway occurs only when the outer and inner seats 68 and 74 are moved to the right, against the compression of spring 80. To achieve this function, as illustrated in FIG. 4, a fifth passageway 118 is provided in the housing 28 connecting with the circumferential passageway 96. This passageway communicates with a sixth passageway 120 extending through the relay body 58 and communicating with a seventh passageway 122 formed in the end cover 64. Shown by the solid line in FIG. 4, with arrows, is the direction of movement of gas pressure to the cavity 62 and thereby to the surface of diaphragm 66. When this pressure build up within the circumferential cavity 96 reaches a point where the pressure overcomes that of spring 80, the diaphragm moves the seat elements to the right, thereby quickly opening the path of gas flow as previously described through passageways 106 and 112 to communicate gas pressure to the control gas outlet 90.

The snap action mode is being employed when the throttling screw 102 is closed, the shut off screw 110 opened, and when the float rises. When the level of fluid within the vessel to which the device is attached is reduced, the action illustrated in FIG. 5 takes place. When the nozzle seat 48 rises off of nozzle 40 gas can freely flow through it and out the exhaust port 42. This relieves gas pressure within the circumferential passageway 96 and therefore, against the diaphragm 66. As this pressure is reduced spring 40 overcomes the pressure applied to the diaphragm and the seats 68 and 74 begin moving to the left. As they move to the left the condition as shown in FIGS. 1 and 5 exist in which both the sealing surfaces 70 and 76 are disengaged, allowing the passage of gas through the opening 124 formed in the relay body 58 which receives the tubular member 72 connecting the seats. This flow of gas is indicated in solid line in FIG. 5. The flow of air releases pressure in the control gas outlet 90 and flows through passageway 112, past sealing surface 76, through opening 124, past sealing surface 70, into recess 60, through the passageway 86, and out the threaded opening 82. This occurs only if plug 84 is removed. Therefore, to achieve the snap action mode, the operator performs three steps. First he closes the throttling screw 102; second, he opens shut off screw 110; and third, he removes plug 84. The device is then ready for the snap action mode of operation.

In order to achieve a throttling mode of operation, in which the elements contained within the relay body 58 are not required, the operator does the following three things: first he opens throttling screw 102; second, he closes shut off screw 110; and third, he inserts plug 84. In this manner the operator can expeditiously and in a very brief time, change a pneumatic control device from a snap action mode to throttling mode, or vice versa.

The invention has been described with reference to a particular embodiment of the invention and it is understood that the invention could be practiced with devices having a great variety of configurations, none of which may have a physical appearance to that which is illustrated herein for purposes of exemplification but which would nevertheless be within the scope of the invention. It is therefore understood that the invention is not to be limited to the embodiments set forth herein but is to be limited only by the scope of the attached claim or claims, including the full range of equivalency to which each element thereof is entitled.

What is claimed is:

1. A pneumatic liquid level control having optionally available either snap action or throttling action in response to liquid level in a vessel, comprising:

a liquid level control body having a gas supply inlet, a control gas outlet, an exhaust port, and having a single nozzle port connected to said gas supply pressure inlet by way of an inlet gas chamber, and a single nozzle closure member actuated by a float means to move said closure member towards and away from said nozzle in response to the level of liquid in a vessel;

a snap action booster having a diaphragm controlled valve;

a first passageway from said gas inlet chamber to said diaphragm whereby said diaphragm control valve is actuated when the pressure in said gas supply chamber exceeds a preselected level;

a manually operated shut off screw in said first passageway which, when closed, deactivates said snap action booster;

a second passageway from said gas supply chamber to said gas control outlet;

a threaded opening in said level control body intersecting said second passageway;

a throttling screw in said threaded opening providing throttling control of gas passing through said second passageway; and a third passageway from said gas supply chamber to said gas control outlet having said diaphragm controlled valve therein, whereby when said closure member is not in proximate contact with said nozzle port, gas from said gas supply chamber passes freely through said nozzle and out through said exhaust port with a resultant low pressure in said gas supply chamber, however when said nozzle closure member is in contact or proximate contact with said nozzle, gas pressure increases in said gas supply chamber, which is communicated to said control gas outlet by way of said second or third passageways depending upon the positions of said shut off screw and said throttling screw.

2. A pneumatic control according to claim 1 wherein said diaphragm actuated valve means includes spring bias means.

3. A pneumatic control according to claim 1 wherein said diaphragm actuated valve means include a closeable exhaust port whereby such valve exhaust port may be opened when the control is to function in the throttling mode.

* * * * *